(12) United States Patent
Strashny et al.

(10) Patent No.: US 12,729,769 B2
(45) Date of Patent: Sep. 8, 2026

(54) BALL FOR A VALVE ASSEMBLY

(71) Applicant: Caterpillar Inc., Peoria, IL (US)

(72) Inventors: Igor Strashny, Tucson, AZ (US); Vinay Jadhav, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 106 days.

(21) Appl. No.: 17/797,805

(22) PCT Filed: Feb. 1, 2021

(86) PCT No.: PCT/US2021/016021
§ 371 (c)(1),
(2) Date: Aug. 5, 2022

(87) PCT Pub. No.: WO2021/158467
PCT Pub. Date: Aug. 12, 2021

(65) Prior Publication Data

US 2023/0057318 A1 Feb. 23, 2023

(30) Foreign Application Priority Data

Feb. 7, 2020 (EP) .................................... 20156216

(51) Int. Cl.
*F16K 15/18* (2006.01)
*F16K 5/06* (2006.01)

(52) U.S. Cl.
CPC ........ *F16K 5/0605* (2013.01); *F16K 15/1848* (2021.08); *Y10T 137/7841* (2015.04); *Y10T 137/7842* (2015.04)

(58) Field of Classification Search
CPC ........... F16K 15/1848; F16K 2200/202; F16K 5/0605; Y10T 137/7841; Y10T 137/7842
See application file for complete search history.

(56) References Cited

U.S. PATENT DOCUMENTS 1,185,333 A * 5/1916 Keltner .................. F16K 15/03 137/493
2,399,300 A * 4/1946 Stewart ..................... B67C 3/16 222/64
3,146,792 A * 9/1964 Donnelly ............. F16K 5/0605 15/104.062
3,348,569 A * 10/1967 Frye .................... F16K 15/1848 137/269.5

(Continued)

FOREIGN PATENT DOCUMENTS

CN 203948711 U 11/2014
CN 205479455 U 8/2016

(Continued)

OTHER PUBLICATIONS

European Search Report related to Application No. EP20156216; reported on Jul. 9, 2020.

(Continued)

*Primary Examiner* — Michael R Reid

(57) ABSTRACT

A ball for a valve assembly, a valve assembly comprising such a ball, a machine comprising such a valve assembly and a method of operating such a valve assembly. The ball comprises a first bore for communicating fluid through the ball and a second bore for communicating fluid through the ball. A bore valve is located in the first bore for selectively enabling fluid communication through the first bore

6 Claims, 6 Drawing Sheets

(56) References Cited

U.S. PATENT DOCUMENTS 3,363,650 A * 1/1968 Scaramucci ........ F16K 15/1848 277/402
3,491,796 A * 1/1970 Scaramucci .......... F16K 5/0605 251/315.13
3,503,415 A * 3/1970 Deangelis ................. F16K 5/08 251/151
3,565,099 A * 2/1971 Huber ..................... F16K 15/03 137/527.8
3,742,975 A 7/1973 Kazama et al.
3,854,497 A * 12/1974 Rosenberg ............ F16K 5/0605 137/557
4,072,161 A * 2/1978 Schoeneweis ........ F16K 5/0657 137/68.16
4,220,176 A * 9/1980 Russell ................... E21B 34/08 137/496
4,226,263 A * 10/1980 Muchow ................... F16K 5/10 251/315.1
4,254,836 A * 3/1981 Russell ................... E21B 34/08 175/218
4,371,146 A * 2/1983 Mese .................... F16K 5/0605 137/614.17
4,655,078 A * 4/1987 Johnson .............. F16K 37/0058 251/207
4,736,771 A * 4/1988 McCafferty ........... F16K 43/003 251/309
4,846,221 A 7/1989 Kanemaru
4,852,610 A * 8/1989 McHugh ................ A62C 37/50 137/271
4,932,436 A * 6/1990 Kanemaru ............ F16K 5/0605 137/614.17
4,936,547 A * 6/1990 Obst ....................... F16K 5/204 251/315.11
5,010,916 A * 4/1991 Albrecht ............... F16K 15/026 137/454.2
5,269,344 A * 12/1993 McHugh ................... G01F 1/28 137/557
5,305,790 A * 4/1994 Giacomini ............ F16K 47/023 137/542
5,373,868 A * 12/1994 Rodriguez .......... F16K 15/1848 137/543
5,406,979 A * 4/1995 McHugh ................ A62C 35/68 137/557
5,437,307 A * 8/1995 Cianfrocca, II .... F16K 11/0873 137/878
5,586,579 A * 12/1996 Diehl .................... F16K 5/0605 137/614.17
5,588,462 A * 12/1996 McHugh ................... G01F 1/28 137/557
5,944,051 A * 8/1999 Johnson .................... F16K 5/10 251/207
6,098,659 A * 8/2000 Mannis ................. F16K 5/0407 251/309
6,186,169 B1 * 2/2001 McHugh ............... F16K 5/0605 251/315.01
6,814,101 B2 * 11/2004 Flauzac ................. F16K 5/0605 137/543.17
7,044,436 B2 5/2006 Corbetta et al.
7,051,763 B2 * 5/2006 Heren ................... F16K 27/067 137/883
7,178,544 B2 * 2/2007 Robison ................ F16K 27/065 137/462
8,910,655 B2 * 12/2014 Oh ........................ F16K 15/063 137/460
9,377,116 B2 * 6/2016 Adi ....................... F16K 17/168
9,791,054 B2 * 10/2017 Al-Amri ................ F16K 35/04
10,165,820 B2 1/2019 Kim
10,428,964 B2 * 10/2019 Smith ................... F16K 17/285
10,502,333 B2 * 12/2019 Rizzio ................. F16K 15/1823
10,550,945 B2 * 2/2020 Orazbayev ............ F16K 5/0605
10,641,398 B2 * 5/2020 Rizzio ................... F16K 5/0657
10,900,208 B2 * 1/2021 Tanghetti .............. F16K 27/067
2004/0206404 A1 * 10/2004 Yang ..................... F16K 5/0605 137/614.17
2005/0109404 A1 * 5/2005 Fazekas .................... F16K 5/06 137/512.3
2008/0135794 A1 * 6/2008 Shnider ............... F16K 15/1848 251/315.1
2015/0129043 A1 * 5/2015 Hughes ................. F16K 5/0605 137/12
2016/0138723 A1 5/2016 Al-Amri
2017/0138491 A1 5/2017 Hughes et al.
2018/0149275 A1 5/2018 Rizzio
2019/0078695 A1 * 3/2019 Tanghetti .............. F16L 37/088

FOREIGN PATENT DOCUMENTS

DE 2833924 A1 2/1980
DE 19754566 A1 6/1999
EP 2447624 A2 5/2012
GB 2203819 A 10/1988

OTHER PUBLICATIONS

International Search Report related to Application No. PCT/US2021/016021; reported on Jun. 4, 2021.

* cited by examiner

| State | A → B | B → A | Angular position | Graphical representation |
|---|---|---|---|---|
| 1 | ON | ON | 0º | A B |
| 2 | OFF | OFF | 45º | A B |
| 3 | OFF | ON | 90º | A B |
| 4 | OFF | OFF | 135º | A B |
| 5 | ON | ON | 180º | A B |
| 6 | OFF | OFF | 225º | A B |
| 7 | ON | OFF | 270º | A B |
| 8 | OFF | OFF | 315º | A B |

FIG. 5

BALL FOR A VALVE ASSEMBLY

CROSS-REFERENCE TO RELATED APPLICATION

This Application is a 35 USC § 371 US National Stage filing of International Application No. PCT/US2021/016021 filed on Feb. 7, 2021 which claims priority under the Paris Convention to European Patent Application No. 20156216.2 filed on Feb. 7, 2020.

TECHNICAL FIELD

This disclosure is directed towards a ball for a valve assembly, a valve assembly comprising such a ball, a machine comprising such a valve assembly and a method of operating such a valve assembly.

BACKGROUND

Machines, marine vessels and industrial systems, such as oil and gas refineries, commonly comprise one or more fluid systems to transfer fluid between locations. For example, machines, including backhoe loaders, excavators, loaders and the like, commonly comprise one or more work tools, such as buckets, backhoes, arms, grapples and the like, attached to the machine by an arm arrangement, for example comprising a stick and a boom. The machine may comprise a fluid system for controlling the arm arrangement and/or work tool and thereby perform work.

It is typically necessary to regulate the flow of fluid in such fluid systems and therefore they typically comprise one or more valve assemblies and other such components. In some fluid systems it may be necessary to include at least one on-off valve, such as a ball valve assembly, and at least one check valve in series with one another. Typically, such fluid systems include a plurality of on-off valves and check valves, thereby increasing the complexity and cost due to the number of different components required. Furthermore, such complex arrangements can lead to inefficiencies due to fluid pressure losses resulting at the plurality of different components.

US20040206404A1 discloses a ball valve assembly includes a housing with a ball valve rotatably received therein. An adjusting shaft extends through a wall of the housing and is connected to the ball valve. A passage is defined through the ball valve and a separation bar is connected to an inner periphery of the passage so as to define a first partition and a second partition in the passage. A seal member is located in the first partition of the passage and a control device is connected to the seal member which movably seals the passage. The ball valve is rotated an angle by rotating the adjusting shaft so that the direction of the flow of the liquid via the ball valve can be changed. However, such a ball valve assembly may only be capable of providing a relatively limited number of actuation states.

SUMMARY

The present disclosure therefore provides a ball for a valve assembly comprising: a first bore for communicating fluid through the ball; a second bore for communicating fluid through the ball; and a bore valve located in the first bore for selectively enabling fluid communication through the first bore.

The present disclosure further provides a valve assembly comprising: a valve housing; the aforementioned ball, wherein the ball is mounted in the valve housing for rotation about an axis of rotation; and first and second valve ports in fluid communication with the first or second bore based upon an angular position of the ball about the axis of rotation.

The present disclosure further provides a machine comprising a fluid system comprising the aforementioned valve assembly configured to selectively control fluid flow through the fluid system.

The present disclosure further provides a method of operating the aforementioned valve assembly comprising rotating the ball around the axis of rotation such that the first or second bore is aligned with or not aligned with the first and second valve ports.

BRIEF DESCRIPTION OF THE DRAWINGS

By way of example only, embodiments of the present disclosure are now described with reference to, and as shown in, the accompanying drawings, in which:

FIG. 5 is a table illustrating different states of operation of the valve assembly of FIG. 1;

DETAILED DESCRIPTION

The present disclosure is generally directed towards a ball for a valve assembly having a bore valve located in a first bore and a further second bore and a valve assembly comprising such a bore. The ball is rotatably mounted in a valve assembly such that it can be rotated between different states in which fluid can be prevented from passing through the ball, pass in both directions through the second bore and/or be controlled by the bore valve when passing through the first bore. The present disclosure further provides a fluid system comprising such a valve assembly, a machine comprising the valve assembly and fluid system and a method of operating the valve assembly.

Figure 1:
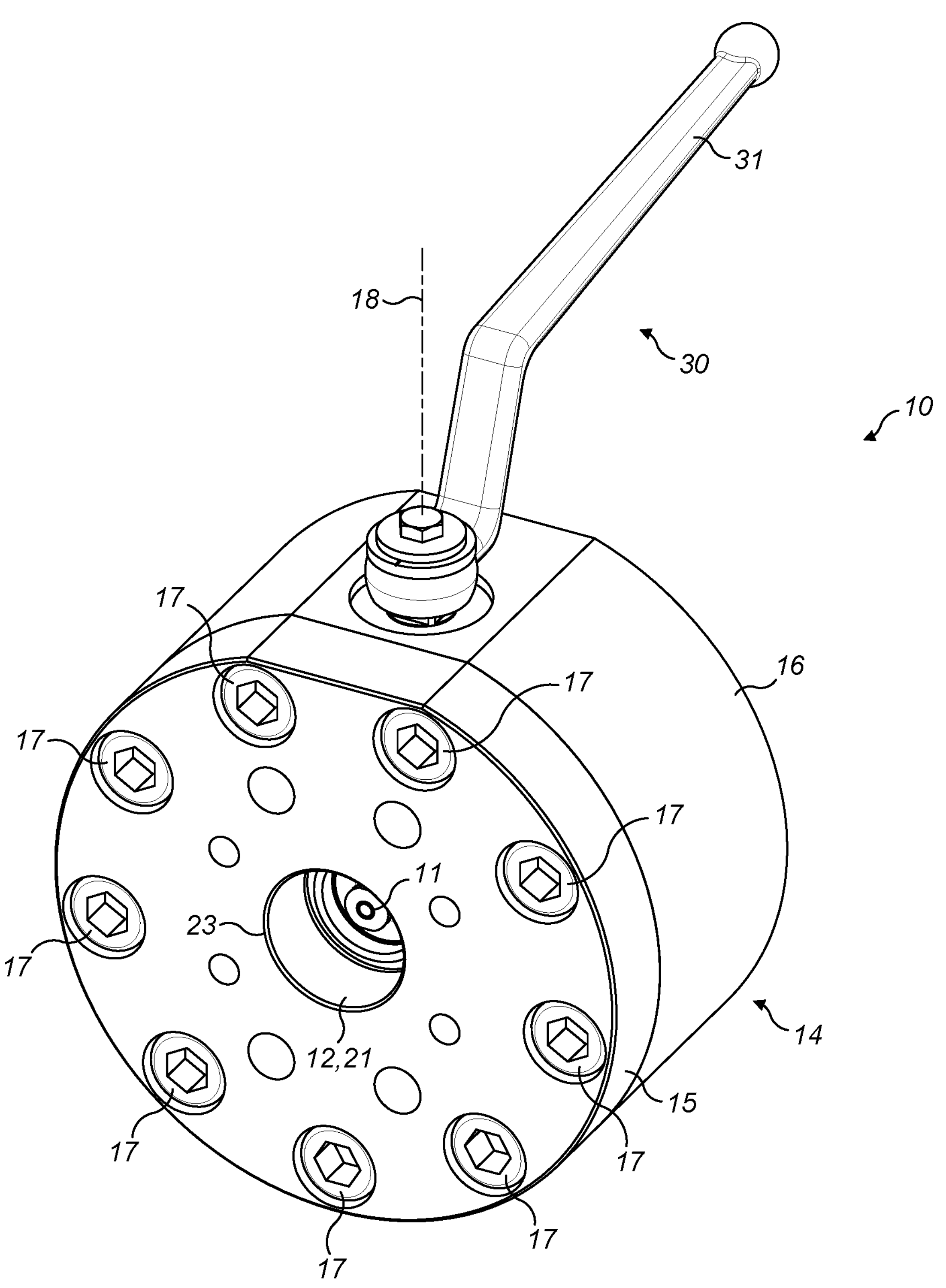
FIG. 1 is an orthographic view of a valve assembly of the present disclosure.
Figure 2:
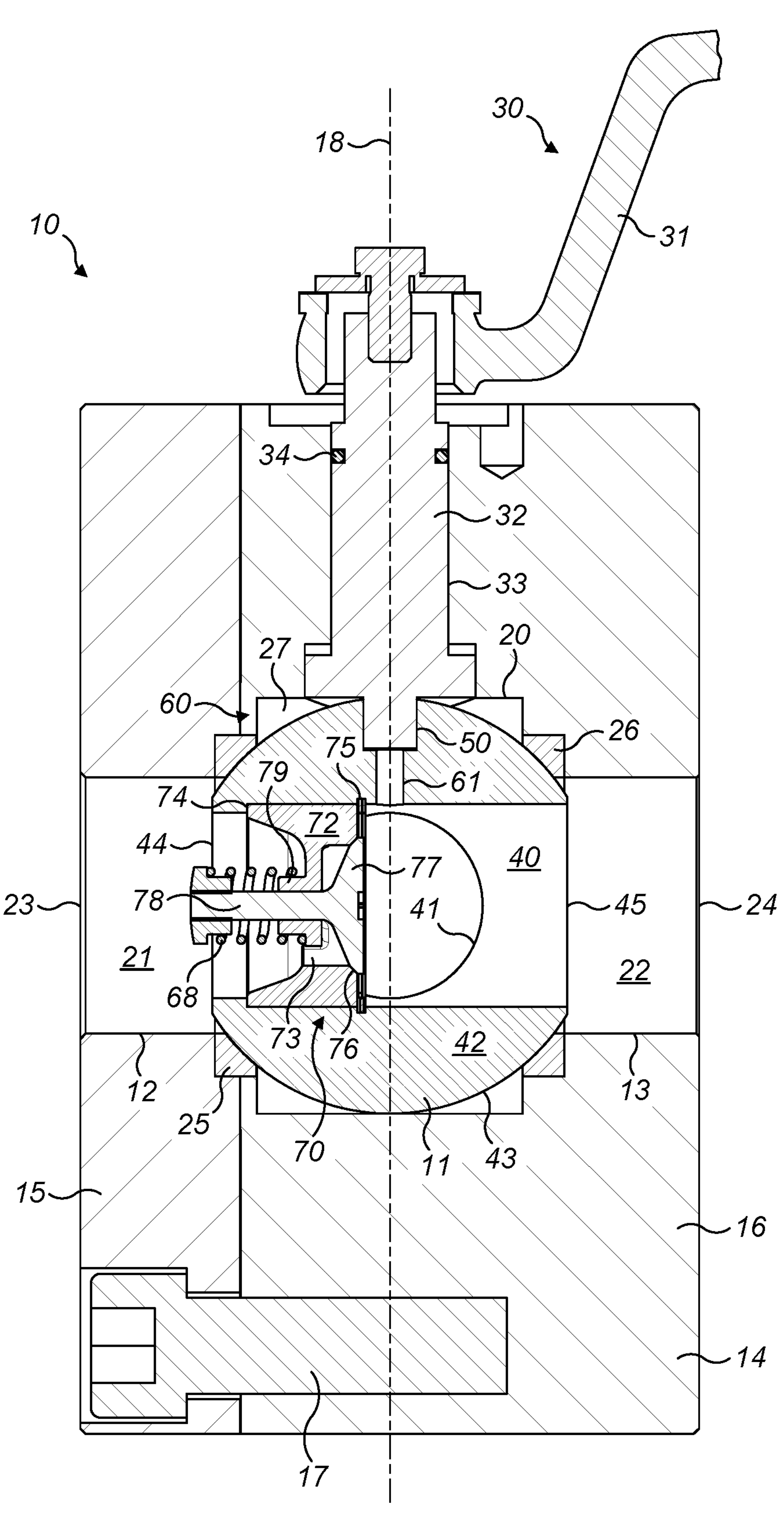
FIG. 2 is a cross-sectional side view of the valve assembly of FIG. 1.
Figure 3:
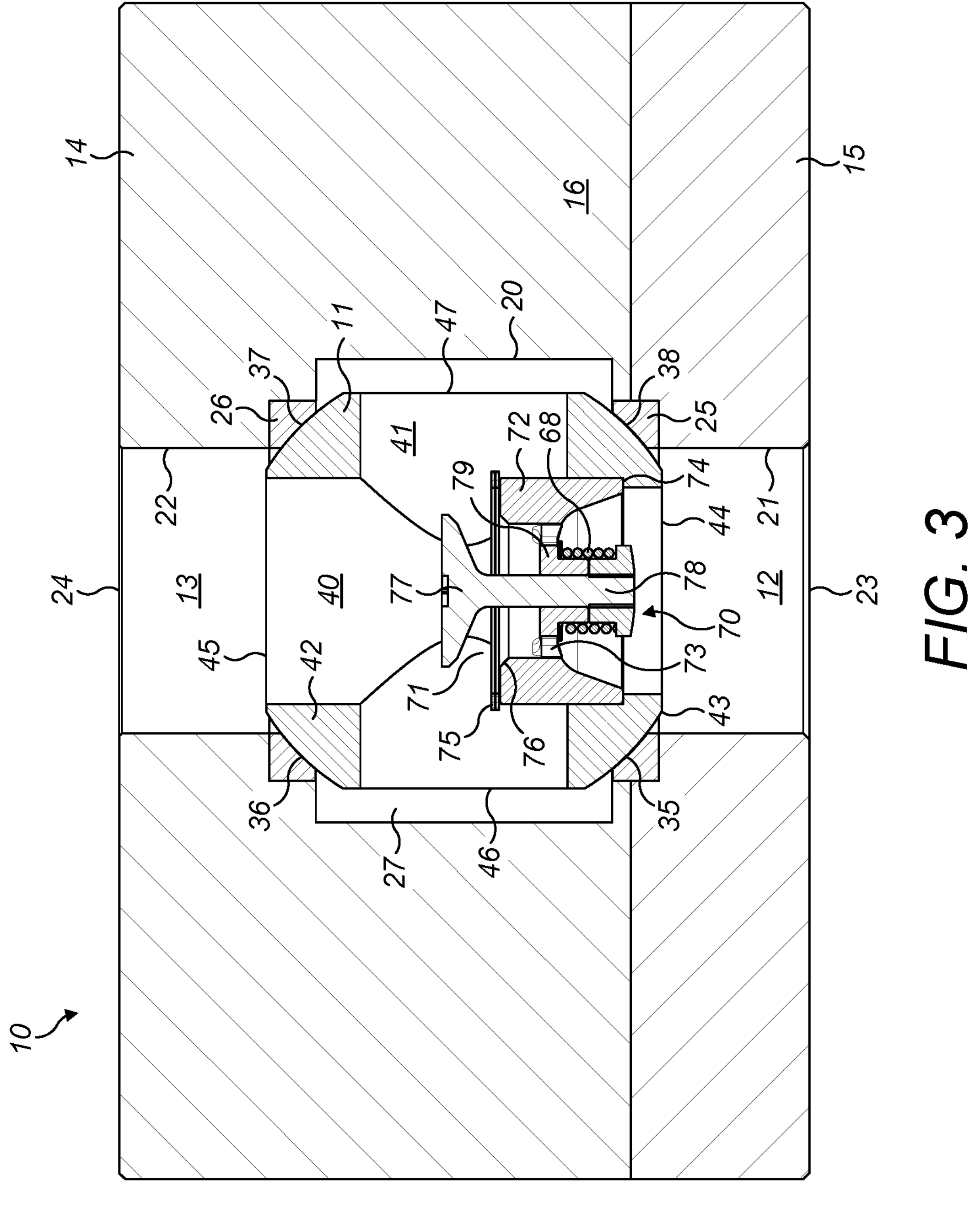
FIG. 3 is a cross-sectional top view of the valve assembly of FIG. 1.

FIGS. 1 to 3 illustrate a valve assembly 10, which may be a ball valve assembly 10, in accordance with the presence disclosure. The valve assembly 10 comprises a ball 11 in fluid communication with a first valve port 12 and a second valve port 13. The valve assembly 10 may be a single line valve assembly 10 and therefore may not comprise any additional ports to the first and second valve ports 12, 13. The valve assembly 10 comprises a valve housing 14, which may comprise first and second valve housing parts 15, 16 connected together by at least one fixture 17, such as a plurality of bolts as illustrated.

The ball 11 and first and second valve ports 12, 13 may be located in the valve housing 14. The ball 11 may be rotatably mounted in the valve housing 14 and may be operable to change its angular position about an axis of rotation 18 in the valve housing 14. The ball 11 may be constrained to rotate around only the axis of rotation 18. The ball 11 may be actuatable between at least one closed state 2, 4, 6, 8 and at least one open state 1, 3, 5, 7 about the axis of rotation 18. The valve housing 14 may comprise a ball chamber 20 in which the ball 11 may be mounted. A seal volume 27 may be formed in the space between the ball 11 and the ball chamber 20.

The first valve port 12 may comprise a first port passageway 21 extending through the valve housing 14 from the ball chamber 20 to the outside of the valve housing 14 via a first outer port aperture 23. The second valve port 13 may comprise a second port passageway 22 extending through the valve housing 14 from the ball chamber 20 to the outside of the valve housing 14 via a second outer port aperture 24.

The first and second valve ports 12, 13, first and second port passageways 21, 22 and/or first and second outer port apertures 23, 24 may be substantially aligned with one another and may be located on opposing sides of the ball 11. The centrelines of the first and second port passageways 21, 22 may be substantially coincident. The ball chamber 20 may have a greater diameter than the first and/or second port passageways 21, 22 as best illustrated in FIG. 2.

The valve assembly 10 may comprise a valve actuation arrangement 30 for controlling the angular position of the ball 11 about the axis of rotation 18, such as between the closed and open states 1, 2, 3, 4, 5, 6, 7, 8. The valve actuation arrangement 30 may comprise a valve actuator 31 and a valve stem 32 engaged with and/or mounted to the ball 11. The valve actuator 31 may selectively control the angular position of the valve stem 32 to control the angular position of the ball 11.

The valve stem 32 may extend through the valve housing 14 and may be mounted to the ball 11 such that the valve stem 32 and ball 11 are constrained to rotate together about the axis of rotation 18. The valve stem 32 may be mounted in a valve stem passageway 33 through the valve housing 14. The valve stem 32 and valve stem passageway 33 may extend substantially orthogonally to the first and second port passageways 21, 22 (i.e. their centrelines extend in orthogonal directions to one another). The valve stem 32 may be sealed within the valve stem passageway 33 by at least one valve stem seal 34, which may be an O-ring as illustrated in FIG. 2.

As in the illustrated embodiment, the valve actuator 31 may comprise a handle for an operator to manually control the valve assembly 10, particularly by rotating the handle such that the valve stem 32 rotates to change angular position of the ball 11. However, the valve actuator 31 may instead be controlled by a control system and may be electromechanical. For example, the valve actuator 31 may comprise a solenoid, motor or the like. Furthermore, the valve actuator 31 may directly control the ball 11 by being mounted thereto and the valve actuation arrangement 30 may not comprise the valve stem 32.

Figure 4:
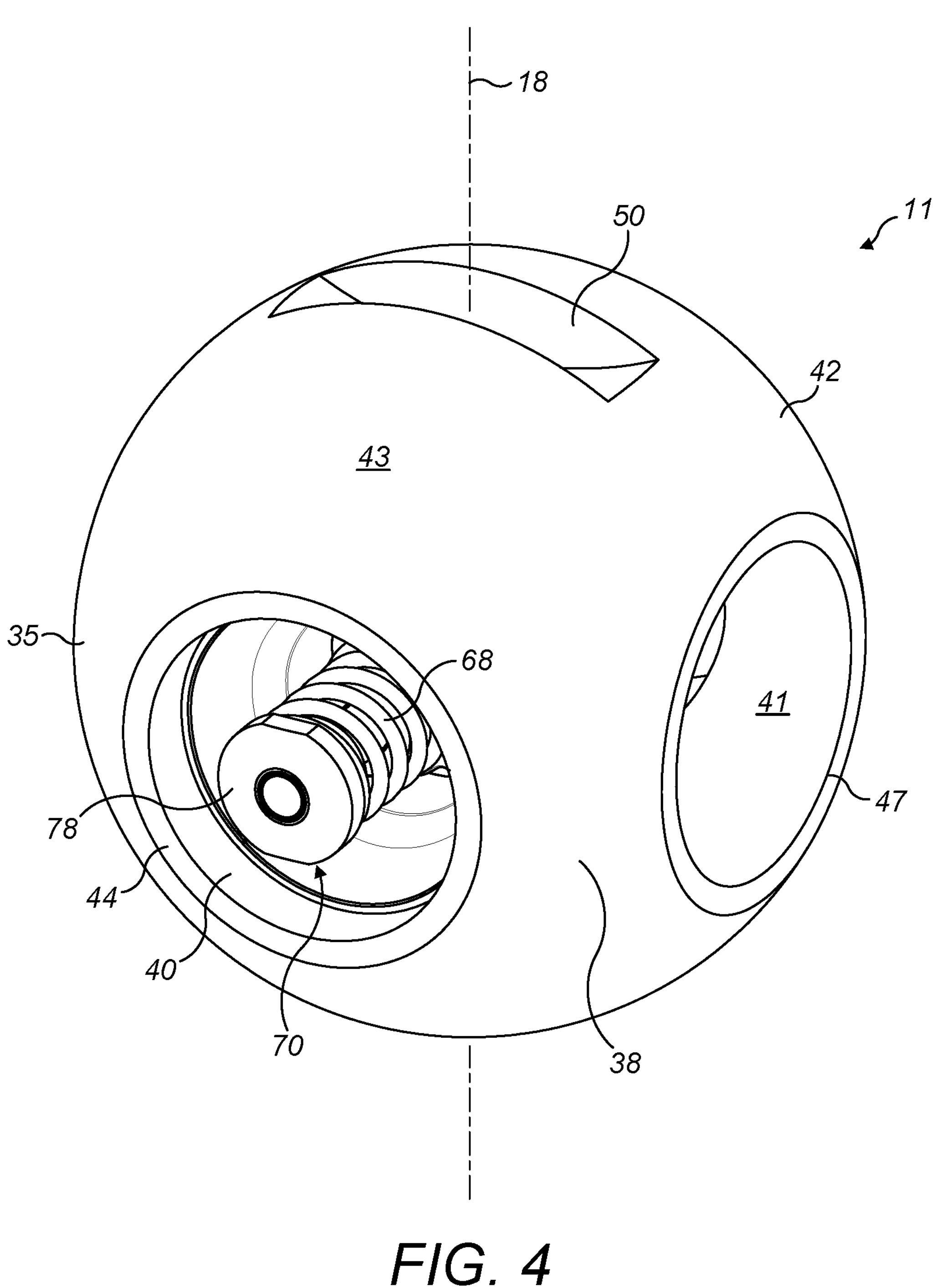
FIG. 4 is an orthographic view of a ball of the valve assembly of FIG. 1.

As illustrated in further detail in FIGS. 2 to 4, the ball 11 comprises a first bore 40 for communicating fluid through the ball 11 and a second bore 41 for communicating fluid through the ball 11. The first and second valve ports 12, 13 are in fluid communication with the first or second bore 40, 41 based upon an angular position of the ball 11 about the axis of rotation 18.

The ball 11 may comprise a ball body 42 comprising a ball outer surface 43. The first and second bores 40, 41 may extend entirely though the ball body 42. Thus the first bore may extend between first bore first and second openings 44, 45 at the ball outer surface 43. The second bore may extend between second bore first and second openings 46, 47 at the ball outer surface 43. The first and second bore first and second openings 44, 45, 46, 47 may be alignable with the first and second valve ports 12, 13 based upon the angular position of the ball 11 about the axis of rotation 18.

The ball 11, particularly the ball outer surface 43 thereof, may comprise first, second, third and fourth blocking surface regions 35, 36, 37, 38 between the adjacent first and second bore first and second openings 44, 45, 46, 47. The first, second, third and fourth blocking surface regions 35, 36, 37, 38 may be alignable with the first and second valve ports 12, 13 based upon the angular position of the ball 11 about the axis of rotation 18.

The first blocking surface region 35 may extend between the first bore first opening 44 and the second bore first opening 46. The second blocking surface region 36 may extend between the second bore first opening 46 and the first bore second opening 45. The third blocking surface region 37 may extend between the first bore second opening 45 and the second bore second opening 47. The fourth blocking surface region 38 may extend between the second bore second opening 47 and the first bore first opening 44.

The second bore 41 may extend through the first bore 40 such that the first and second bores 40, 41 are in fluid communication with one another. The first and second bores 40, 41 may have substantially similar diameters (e.g. the diameter of the first bore 40 may be in the range of about 75% to about 125% of the diameter of the second bore 41) and may have substantially the same diameter.

The first and second bores 40, 41, and particularly their centrelines, may extend in at least one plane orthogonal to the axis of rotation 18. The first and second bores 40, 41 may extend substantially orthogonal to one another and the centrelines of the first and second bores 40, 41 may intersect one another. The first and second bores 40, 41 may extend substantially centrally through the ball body 42 such that their centrelines intersect the axis of rotation 18.

The ball 11 may comprise a stem mount 50 for engaging and/or mounting with the valve actuation arrangement 30, such as the valve stem 32. The stem mount 50 may comprise a recess in the ball outer surface 43 as illustrated. The valve stem 32 may engage in the recess such that as the valve stem 32 and ball 11 are constrained to rotate together around the axis of rotation 18.

The ball body 42 and ball outer surface 43 may be shaped such that the ball 11 is rotatable within the valve housing 14 and therefore may be substantially spherically shaped. In particular, the ball outer surface 43 may extend substantially spherically. The ball body 42 may not have a completely spherical shape due to the first and second bore first and second openings 44, 45, 46, 47 and stem mount 50 being located at the ball outer surface 43 and forming indentations in the sphere.

The valve assembly 10 may comprise a seal arrangement 60 comprising a fluid vent 61, the seal volume 27 and at least one ball seal 25, 26. The seal arrangement 60 may prevent fluid passing between the first and second valve ports 12, 13 when the ball 11 is in at least one closed state 2, 4, 6, 8. Although not illustrated in the drawings, the seal arrangement 60 may further comprise a seal, such as an O-ring seal, between the first and second valve housing parts 15, 16.

The at least one ball seal 25, 26 may substantially seal the ball chamber 20 and/or seal volume 27 from the first and second valve ports 12, 13. In particular, the valve assembly 10 may comprise first and second ball seals 25, 26, which may be located in the ball chamber 20 between the ball 11 and valve housing 14 and may be adjacent to the first and second port passageways 21, 22 respectively. The at least one ball seal 25, 26 may substantially seal fluid from communicating from the seal volume 27 to the first or second valve ports 12, 13 between the ball 11 and the ball chamber 20. The at least one ball seal 25, 26 may comprise a radial seal as illustrated.

The ball 11 may comprise the fluid vent 61 extending from the first and/or second bore 40, 41 to outside of the ball 11, particularly of the ball body 42. The fluid vent 61 may be for fluid communication between the first and/or second bore 40, 41 and the seal volume 27. As illustrated, the fluid vent 61 may comprise a passageway extending through the ball body 42 from the first and/or second bore 40, 41 to the stem mount 50, such as the bottom of the recess. The fluid vent 61 may have a smaller diameter of than the first and/or second bore 40, 41 and may, for example, have a diameter that is less than about 50% or about 25% or about 10% of the diameter of the first and/or second bore 40, 41.

The seal arrangement 60 may provide a seal when the ball 11 is in the at least one closed state 2, 4, 6, 8 or in at least one unidirectional open state 3, 7 (discussed further below) and there is a differential pressure acting in the closed direction. In particular, when the ball 11 is in at least one closed state 2, 4, 6, 8 differential pressure may direct the ball 11 onto the first or second ball seal 25, 26 to form a seal and prevent fluid flow into the respective first or second valve port 12, 13. The fluid pressure upstream of this formed seal may be at equal pressure and the fluid vent 61 may maintain the equal pressure in the seal volume 27 by enabling fluid flow therethrough.

The ball 11 comprises a bore valve 70 located in the first bore 40 for selectively allowing fluid to be communicated through the first bore 40. Although the present disclosure refers to the bore valve 70 being located in the first bore 40, it will be appreciated that the nomenclature of "first and second" bores 40, 41 may be interchanged such that the bore valve 70 may be considered to be located in the "second" bore 41. Furthermore, further bore valve(s) 70 may be located in the first and/or second bores 40, 41.

The bore valve 70 may be a one-way valve and/or may be a check valve. The bore valve 70 may be biased to a closed configuration as shown in FIG. 2. The bore valve 70 may be selectively openable based upon a pressure differential across the bore valve 70 reaching a bore valve opening threshold. The type and arrangement of the bore valve 70 may be selected to have a suitable bore valve opening threshold for the fluid system in which the valve assembly 10 may be located. The bore valve 70 may be a poppet valve as illustrated, but may also be a reed valve, ball valve, butterfly valve or the like.

The bore valve 70 may be located substantially entirely in the ball body 42 and may not extend out of the first bore 40. The bore valve 70 may not extend, or may extend only partially as illustrated, across the second bore 41, particularly when the bore valve 70 is open. The bore valve 70 may be offset from the axis of rotation 18 and/or offset along the first bore 40. In particular, the bore valve 70 may comprise a selectively openable bore valve opening 71 and the bore valve opening 71 may be offset from the axis of rotation 18 and/or offset along the first bore 40.

The bore valve 70 may comprise a bore valve housing 72 mounted in the first bore 40. The bore valve housing 72 may comprise at least one bore valve passageway 73 therethrough for fluid communication therethrough. The first bore 40 may comprise a first bore step 74, which may result from a step change in diameter along the first bore 40, and the bore valve housing 72 may be mounted and abut against the first bore step 74.

The bore valve 70 may comprise at least one retainer ring 75 and the bore valve housing 72 may be mounted between the at least one retainer ring 75 and first bore step 74 such that the bore valve housing 72 is constrained axially along the first bore 40. The first bore step 74 may be further from the axis of rotation 18 than the at least one retainer ring 75 as illustrated. Alternatively, the first bore step 74 may be closer to the axis of rotation 18 than the at least one retainer ring 75 (i.e. their locations in FIG. 2 are swapped).

Further alternatively, the bore valve housing 72 may be fully integrated with and form part of the ball body 42 such that the first bore step 74 and at least one retainer ring 75 are not required. Alternatively the bore valve 70 and/or bore valve housing 72 may be press fitted, brazed, welded, friction welded, soldered, threaded or otherwise mounted into the first bore 40 and the at least one retainer ring 75 may therefore not be required.

The bore valve 70 may comprise, as illustrated in FIGS. 2 and 3, a bore valve seat 76 to which a bore valve head 77 may be selectively mounted. The bore valve head 77 may be selectively moveable away from the bore valve seat 76 to form the bore valve opening 71 as in FIG. 3. The bore valve head 77 may be attached to a bore valve stem 78 mounted to a bore valve stem mount 79 in the bore valve housing 72.

As illustrated, the bore valve 70 may comprise at least one spring 68 mounted to the bore valve stem 78 for biasing the bore valve head 77 towards the closed configuration in which no bore valve opening 71 is formed as in FIG. 2.

The bore valve 70 may be configured such that it does not substantially impede or prevent flow through the second bore 41. In particular, the bore valve 70 may be configured such that the bore valve head 77 does not extend at all or only partially extends across the second bore 41 when in the open configuration as shown in FIG. 3. Thus the bore valve head 77 does not extend all the way across the second bore 41 and does not substantially interrupt the flow of fluid through the second bore 41.

In operation the ball 11 is rotated by the valve actuation arrangement 30 around the axis of rotation 18 such that the first or second bore 40, 41 is aligned with or not aligned with the first and second valve ports 12, 13. The valve assembly 10 may be operable in or configurable into a plurality of different states 1, 2, 3, 4, 5, 6, 7, 8 based upon the angular position of the ball 11.

Exemplary states 1, 2, 3, 4, 5, 6, 7, 8 are illustrated in FIG. 5. The first column illustrates the state number, namely states 1 to 8. The second column illustrates, for each state 1, 2, 3, 4, 5, 6, 7, 8, fluid flow from the first valve port 12, illustrated as "A", to the second valve port 13, illustrated as "B", is on or off. The third column illustrates, for each state 1, 2, 3, 4, 5, 6, 7, 8, whether fluid flow from the second valve port 13 to the first valve port 12 is on or off. The fourth column illustrates, for each state 1, 2, 3, 4, 5, 6, 7, 8, the angular position in degrees relative to the angular position in state 1. The fifth column graphically illustrates the angular position of the ball 11 for each state 1, 2, 3, 4, 5, 6, 7, 8 and the first bore 40 is illustrated as comprising a check valve.

The valve assembly 10 may be operable in at least one open state 1, 3, 5, 7 in which the first or second bore 40, 41 is aligned with the first and second valve port 12, 13 such that fluid can flow therethrough and through the valve assembly 10.

In at least one bidirectional open state 1, 5, such as the first and second bidirectional open states 1, 5, the second bore 41 may be aligned with the first and second valve port 12, 13 such that fluid is able to flow through the ball 11 in both directions. However, the angular position of the ball 11 and second bore 41 between the first and second bidirectional open states 1, 5 differs by 180 degrees. Thus the second bore first and second openings 46, 47 are adjacent the first and second valve ports 12, 13 respectively in the first bidirectional open state 1 and vice-versa in the second bidirectional open state 5.

In at least one controlled open state 3, 7, such as first and second controlled open states 3, 7, the first bore 40 may be aligned with the first and second valve port 12, 13 and the fluid flow through the first bore 40 may be controlled by the bore valve 70. The angular position of the ball 11 and first bore 40 between the first and second controlled open states 3, 7 differs by 180 degrees. Thus the first bore first and second openings 44, 45 are adjacent the first and second valve ports 12, 13 respectively in the first controlled open state 3 and vice-versa in the second controlled open state 7.

If the bore valve 70 comprises a one-way valve as illustrated in FIG. 5, when the first bore 40 is aligned with the first and second valve port 12, 13 fluid is able to flow through the ball 11 in only one direction. Thus the first and second controlled open states 3, 7 may be first and second unidirectional open states 3, 7. However, the direction of flow may be reversible along the first bore 40 by adjusting the angular position of the ball 11 by 180 degrees such that the one-way valve is configured to allow flow in the reverse direction. In the first and second unidirectional open states 3, 7 fluid flow may be enabled once the bore valve 70 opens in response to the bore valve opening threshold pressure being reached.

The valve assembly 10 may be operable in at least one closed state 2, 4, 6, 8 in which the first or second bore 40, 41 are not aligned with the first and second valve port 12, 13 (instead they may be aligned with the ball chamber 20) such that fluid is blocked from flowing through the ball 11 and through the valve assembly 10. The ball 11 may comprise blocking surface regions 35, 36, 37, 38 for blocking flow through the ball 11 when aligned with the first and second valve port 12, 13. In particular, pairs of opposing first, second, third and fourth blocking surface regions 35, 36, 37, 38 are aligned with the first and second valve port 12, 13 such that fluid is blocked from flowing through the ball 11 and through the valve assembly 10. In particular, the valve assembly 10 may be operable in four closed states 2, 4, 6 and 8, in which opposing pairs of the first, second, third and fourth blocking surface regions 35, 36, 37, 38 may be aligned with the first and second valve port 12, 13.

In order for the valve assembly 10 to be operable in the plurality of states 1, 2, 3, 4, 5, 6, 7, 8 its dimensions may be selected accordingly. In particular, the size of the blocking surface regions 35, 36, 37, 38 may be sufficiently large to ensure that fluid flow is blocked when they are aligned with the first and second valve ports 12, 13. The valve assembly 10 may be configured such that the blocking surface regions 35, 36, 37, 38 are able to form a spherical interface across the first and second ball seals 25, 26 and the first and second valve ports 12, 13 to prevent fluid flow. Thus the diameter of the first and second valve ports 12, 13 may be selected such that the blocking surface regions 35, 36, 37, 38 form a spherical interface across the first and second ball seals 25, 26 to block the fluid flow.

The present disclosure further provides a fluid system comprising the valve assembly 10 configured to control fluid flow through the fluid system. The fluid system may comprise at least one inlet conduit in fluid communication with the first valve port 12 and at least one outlet conduit in fluid communication with the second valve port 13.

The valve assembly 10 illustrated in FIGS. 1 to 4 may be particularly applicable fluid systems for marine vessels and industrial systems, such as oil and gas refineries. However, the features and methods of operation disclosed herein may also be suitable for fluid systems in a machine, such as an excavator, truck (e.g. a dump truck), backhoe loader, another type of loader such as a wheel loader or track loader, dozer, shovel, material handler or telehandler.

Figure 6:
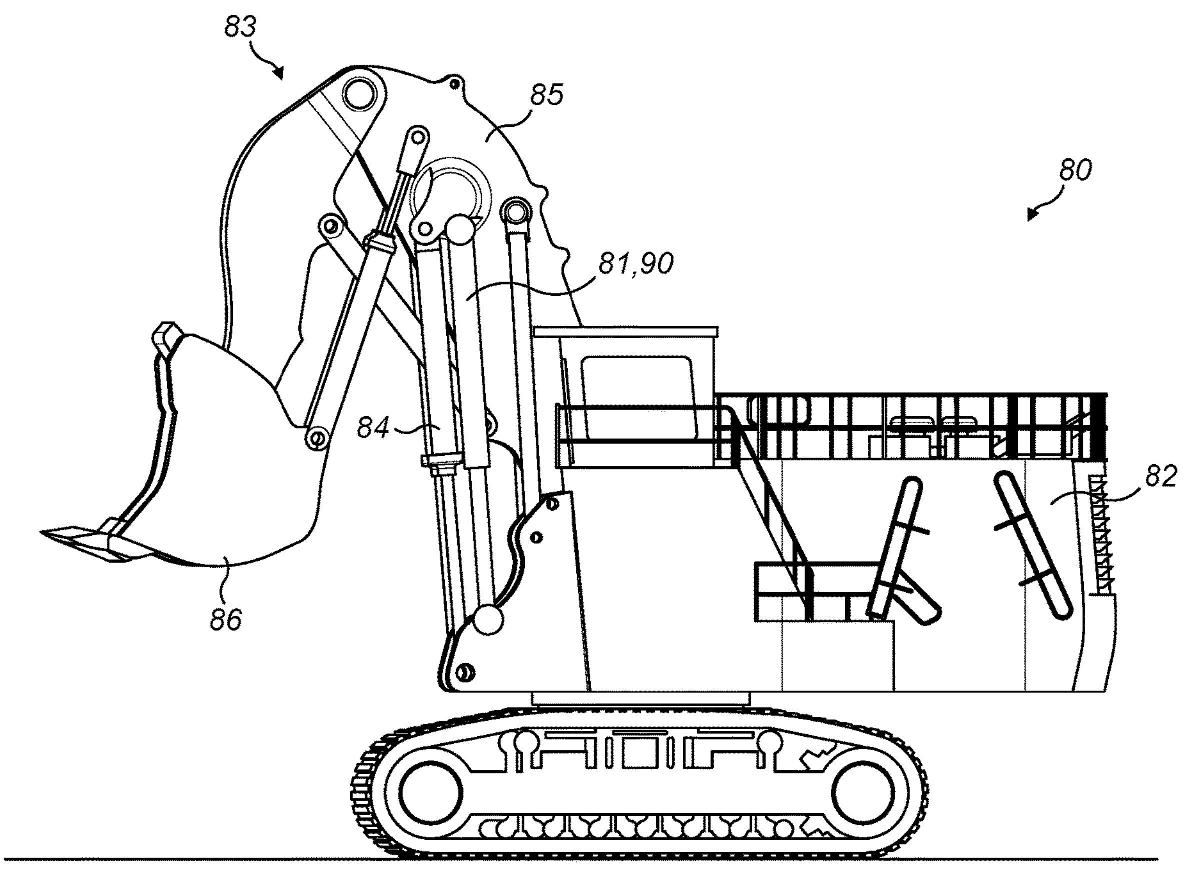
FIG. 6 is a side view of a machine comprising the valve assembly of the present disclosure.

FIG. 6 illustrates a machine 80 comprising a fluid system 81 comprising the valve assembly 10 of the present disclosure and configured to selectively control fluid flow through the fluid system. The machine 80 may comprise a main body 82 and a work tool 83 attached to the main body 82. The work tool 83 may be controlled by at least one actuator 84. The work tool 83 may comprise an arm arrangement 85 mounted to the main body 82 and an implement 86 attached to the arm arrangement 85 as illustrated. The arm arrangement 85, may be controlled by the at least one actuator 84 to move the implement 86 and perform work. In the illustrated embodiment the machine 80 comprises an excavator.

Figure 7:
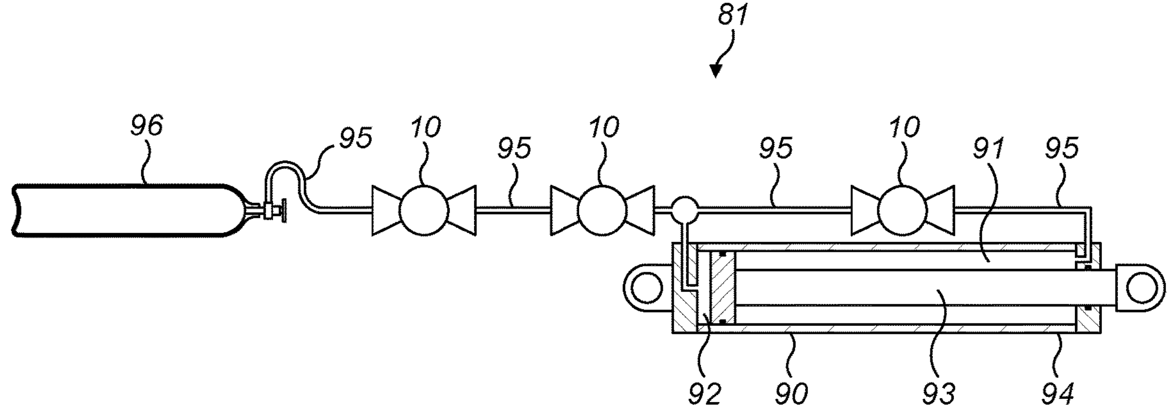
FIG. 7 is a schematic of a fluid system of the machine of FIG. 6 comprising the valve assembly of the present disclosure.

The machine 80 may comprise a gas spring arrangement 90 and, as further illustrated in FIG. 7, the fluid system 81 may comprise the gas spring arrangement 90. The gas spring arrangement 90 may comprise first and second gas chambers 91, 92 formed by a piston 93 retractably and moveably mounted inside a cylinder 94. The gas spring arrangement 90 may be configured to store and release energy to assist in the operation of the work tool 83 in addition to the at least one actuator 84 controlling the work tool 83. Alternatively, the gas spring arrangement 90 may be integrated with the at least one actuator 84. The machine 80 may comprise a plurality of gas spring arrangements 90.

The fluid system 81 may comprise at least one conduit 95, at least one valve assembly 10 and at least one fluid reservoir 96. The first and second gas chambers 91, 92 may be connected together by at least one conduit 95 and fluid communication therebetween may be controlled by at least one valve assembly 10. The at least one fluid reservoir 96 may be connected to the first and second gas chambers 91, 92 and that the fluid communication therebetween may also be controlled by at least one valve assembly 10. The fluid system 81 may be a pneumatic fluid system 81 such that the fluid is a gas.

The at least one valve assembly 10 may be substantially similar to that disclosed in FIGS. 1 to 5 except that the valve actuator 31 may not be a handle and may instead be controlled by a control system and/or by a servo actuator commanded by a control system (not illustrated). The fluid system 81 may therefore be controlled to selectively store and release energy by controlling the flow of fluid between the first gas chamber 91, second gas chamber 92 and at least one fluid reservoir 96.

INDUSTRIAL APPLICABILITY

The valve assembly 10 of the present disclosure enables a plurality of flow logic states 1, 2, 3, 4, 5, 6, 7, 8 (as illustrated in FIG. 5) to be implemented in a single valve assembly 10 rather than in a fluid system comprising separate on-off valves and one-way valves. In particular, the valve assembly 10 enable fluid flow between the first and second valve ports 12, 13 to be blocked, allowed in both directions or allowed in only one or the other direction.

Furthermore, the valve assembly 10 provides a plurality of states 1, 2, 3, 4, 5, 6, 7, 8 achieving substantially the same result. For example, the valve assembly 10 is operable in four closed states 2, 4, 6, 8 and two bidirectional open states 1, 5. As a result, redundancy is improved. In addition, the response time of the valve assembly 10 when switching between states 1, 2, 3, 4, 5, 6, 7, 8 may be improved because, when there are multiple states 1, 2, 3, 4, 5, 6, 7, 8 that can achieve the required control, the valve assembly 10 can be operated to the appropriate state 1, 2, 3, 4, 5, 6, 7, 8 requiring the smallest angle of rotation.

By virtue of the bore valve 70 being offset from the axis of rotation 18 it may not substantially block fluid flowing along the second bore 41 when the valve assembly 10 is in the first or second bidirectional open state 1, 5. The use of a poppet valve, in which the bore valve head 77 only extends partially across the second bore 41 when opened, is particularly suitable in achieving such an effect.

The invention claimed is:

1. A valve assembly comprising:

a valve housing having a first valve port and a second valve port; and a ball mounted in the valve housing and rotatable about an axis of rotation, the ball comprising;

an outer surface;

a first bore that opens to the outer surface, the first bore configured to permit fluid to flow along a first path through the ball;

a second bore that opens to the outer surface, the second bore configured to permit fluid to flow through the ball in a different path than the first bore;

the first and second bores intersecting and in fluid communication with one another;

blocking surface portions of the outer surface;

the ball having a first orientation relative to the valve housing wherein the first bore is aligned with the first and second valve ports of the valve housing;

a bore valve located in the first bore, the bore valve configured such that fluid communication is selectively enabled through the first bore when the ball is in the first orientation and the first bore is aligned with the first and second valve ports, the bore valve not extending, or extending only partially across the second bore, the bore valve includes a biasing member that biases the valve into a closed configuration, and the bore valve opens and permits fluid to flow, via the first bore, between the first valve port and the second valve port of the valve housing and into the second bore when a pressure differential across the valve exceeds a threshold;

wherein the ball has a second orientation wherein the second bore is aligned with the first and second valve ports of the valve housing and permits fluid to flow, via the second bore, between the first valve port and the second valve port of the valve housing; and wherein the ball has a third orientation wherein the blocking surface portions block the first and second valve ports of the valve housing and prevent fluid from flowing between the first and second valve ports.

2. The valve assembly as claimed in claim 1 wherein the valve assembly is configured such that the valve assembly includes:

at least one bidirectional open state in which the ball has the second orientation wherein the second bore is aligned with the first and second valve port such that fluid flows through the ball in both directions;

at least one controlled open state in which the ball has the first orientation wherein the first bore is aligned with the first and second valve port and fluid flow through the first bore is controlled by the bore valve; and/or at least one closed state in which the ball has the third orientation wherein the first and second bore are not aligned with the first and second valve port such that fluid is blocked from flowing through the ball.

3. The valve assembly as claimed in claim 1 further comprising a seal arrangement configured such that fluid is prevented from passing from the first to second valve ports and/or vice versa.

4. A machine comprising a fluid system comprising the valve assembly of claim 1 configured such that fluid flow through the fluid system is selectively controlled.

5. A method of operating the valve assembly of claim 1 comprising rotating the ball around the axis of rotation such that the first or second bore is aligned with or not aligned with the first and second valve ports.

6. The method as claimed in claim 5 comprising rotating the ball into at least one of:

at least one bidirectional open state in which the ball has the second orientation wherein the second bore is aligned with the first and second valve port such that fluid flows through the ball in both directions;

at least one controlled open state in which the ball has the first orientation wherein the first bore is aligned with the first and second valve port and fluid flow through the first bore is controlled by the bore valve; and/or at least one closed state in which the ball has the third orientation wherein the first and second bore are not aligned with the first and second valve port such that fluid is blocked from flowing through the ball.

* * * * *